United States Patent [19]
Sterner
[11] 4,045,936
[45] Sept. 6, 1977

[54] TELESCOPIC BOOM WITH SECTIONS OF BEAM AND TRUSS CONSTRUCTION

[75] Inventor: Russell L. Sterner, South Milwaukee, Wis.

[73] Assignee: Bucyrus-Erie Company, South Milwaukee, Wis.

[21] Appl. No.: 680,257

[22] Filed: Apr. 26, 1976

[51] Int. Cl.² .......... B66F 9/08; F16C 23/04

[52] U.S. Cl. .......... 52/632; 52/118; 214/141; 308/3 R

[58] Field of Search .......... 52/115, 118, 632, 634, 52/648, 654; 212/144, 55; 214/141; 308/3 R

[56] References Cited

U.S. PATENT DOCUMENTS

| | | | |
|---|---|---|---|
| 2,726,743 | 12/1955 | Short et al. | 52/632 |
| 2,888,300 | 5/1959 | Curtis et al. | 308/3 R X |
| 3,377,638 | 4/1968 | Seipos | 308/3 R X |
| 3,537,762 | 11/1970 | Lodige | 308/3 R |
| 3,748,807 | 7/1973 | Sterner | 52/632 |
| 3,837,502 | 9/1974 | Hornagold | 52/115 X |

FOREIGN PATENT DOCUMENTS

| | | | |
|---|---|---|---|
| 586,692 | 12/1958 | Italy | 52/632 |

*Primary Examiner*—Alfred C. Perham
*Attorney, Agent, or Firm*—Quarles & Brady

[57] ABSTRACT

A multi-section telescopic boom has sections with reinforced I-beam side walls and top and bottom walls made up of truss members. The trusses and beam stiffeners are disposed interiorly of the beam flanges so that the flanges provide continuous upper, lower and side bearing surfaces engageable with wear pads all of which are on the next outermost section. The lower and side wear pads are elastomer backed and the side pads have backup buttons that can easily be shimmed out to compensate for wear.

7 Claims, 16 Drawing Figures

Fig. 11
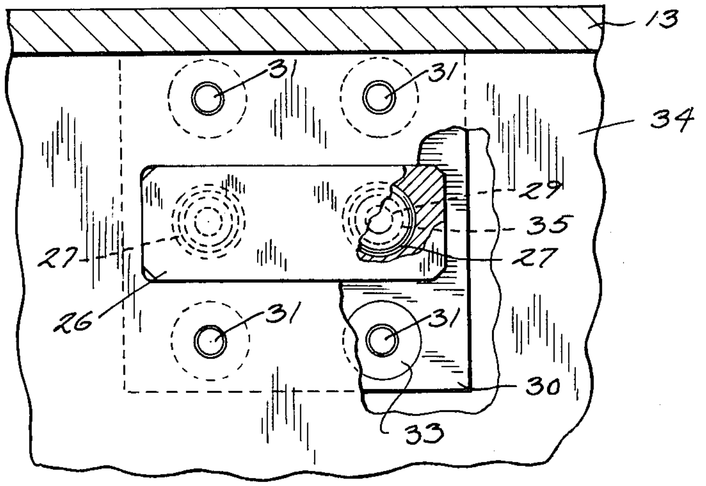
Fig. 12
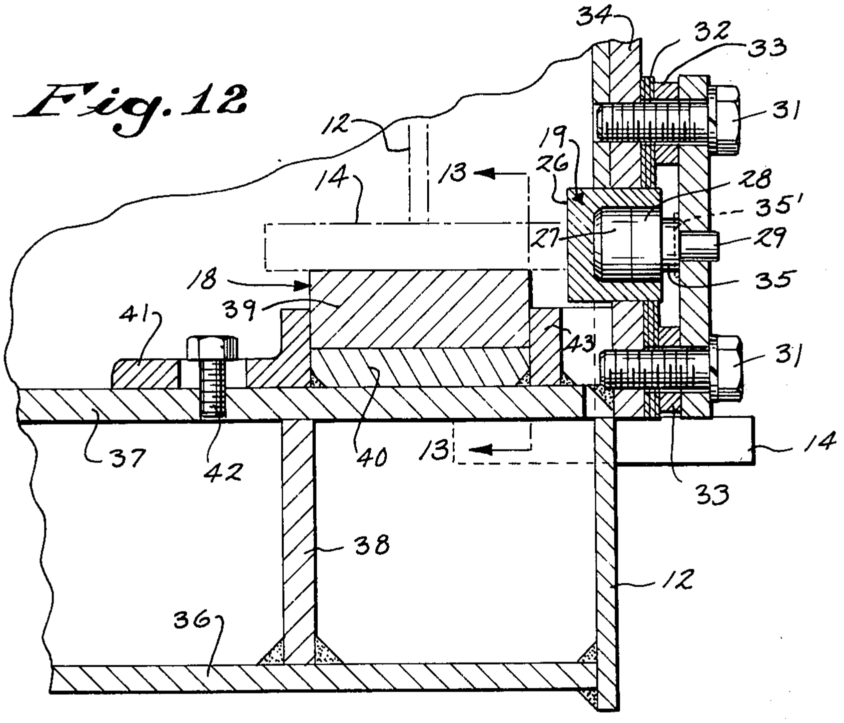
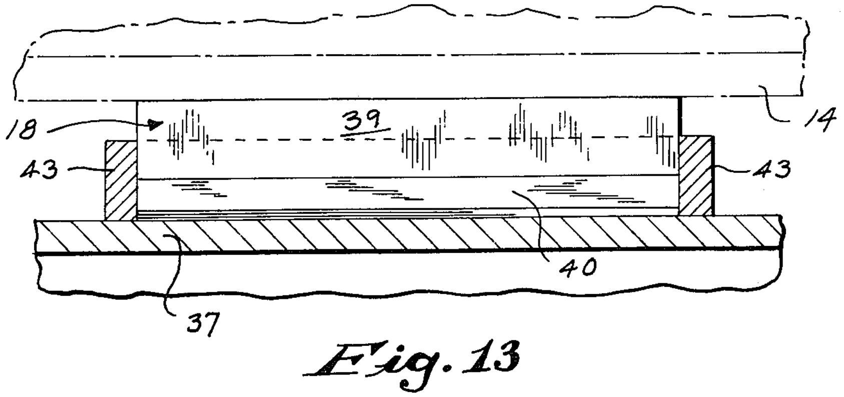
Fig. 13

TELESCOPIC BOOM WITH SECTIONS OF BEAM AND TRUSS CONSTRUCTION

BACKGROUND OF THE INVENTION

This invention relates to multi-section telescopic booms for truck mounted cranes or the like, and particularly to a unique boom construction which has a substantially greater load capacity for a given boom weight.

Most current telescoping booms have solid or essentially solid side, top and bottom walls, and the boom of this invention is intended primarily to overcome problems that would arise in providing greater load capacity using this construction. Full lattice booms are also known and may avoid some of the problems discussed below; but it is difficult for various reasons to construct large lattice booms, one problem being the provision of suitable bearing surfaces for relatively telescoping sections.

In designing a boom to lift a heavier load, the height of the side walls must obviously be increased to provide the needed vertical rigidity; however, the width of the boom sections must also be increased to prevent excessive twisting or lateral flexing of the boom about its longitudinal axis. Booms with a solid wall construction cannot as a practical matter be scaled up for very high loads, since a limit is ultimately reached beyond which the increase in size results in an inordinate increase in weight, and a net decrease in lifting capacity.

Another problem with conventional solid wall constructions arises from the fact that inner wear pads are usually mounted on an inner section and ride along the top wall of the next outer section and these pads exert tremendous upward forces on the top wall of the outer section. Consequently, the thickness of the top wall must usually exceed that of the other walls to withstand these forces, and this thickness must be uniform throughout the boom length so that a continuous bearing surface is present to accommodate any desired relative position between the sections. In a very large capacity boom, the increase in weight resulting from the material which must be added to the top walls of the appropriate sections increases the overall weight of the boom beyond acceptable limits.

Another problem which occurs as the cross section size of a solid wall boom is increased is a corresponding inefficient consumption of material. That is, some portions of the walls are not subjected to the same forces as others, but it would not be practical to vary wall thickness and so the whole wall is made of maximum thickness, resulting in both excess weight and waste of material.

SUMMARY OF THE INVENTION

The present invention contemplates an improved telescopic boom construction utilizing sections having I-beam side walls, preferably with a thin web and stiffeners for reinforcement, and truss top and bottom walls. It also contemplates a boom where all wear pads are on the outer of any two sections, the trusses and any stiffeners being located interiorly of the beam flanges so that the flanges provide continuous bearing surfaces for the pads. Some of the pads are preferably elastomer backed, and some are preferably provided with backup buttons that can be shimmed out to compensate for wear.

The primary object of the invention is to provide a telescopic boom construction having a substantially greater load capacity for a given boom weight; it is possible, for example, using the construction shown in the preferred embodiment herein, to increase the load capacity about 18 to 25 percent for a given weight. In addition, the invention provides a boom that makes efficient and minimum use of materials, is of relatively low cost, and is relatively easy to manufacture and assemble.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in many different embodiments, and reference is made to the claims herein for interpreting the breadth of the invention.

BRIEF DESCRIPTION OF THE DRAWINGS

FIG. 11 is a fragmentary view in cross section through the plane 11—11 shown in FIG. 9;

FIG. 12 is a fragmentary view in cross section through the plane 12—12 shown in FIG. 4;

FIG. 13 is a fragmentary view in cross section through the plane 13—13 shown in FIG. 12;

DESCRIPTION OF THE PREFERRED EMBODIMENT

Figure 1:
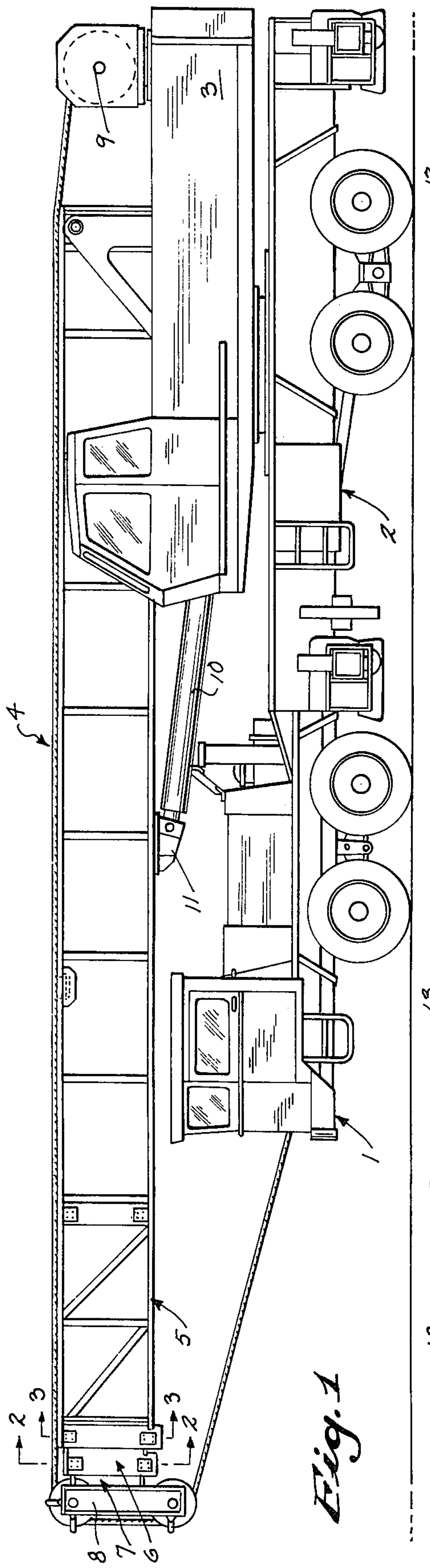
FIG. 1 is a somewhat schematic side view in elevation of a truck crane which includes a boom constituting a preferred embodiment of the invention, the boom being shown in a fully retracted position.
Figure 2:
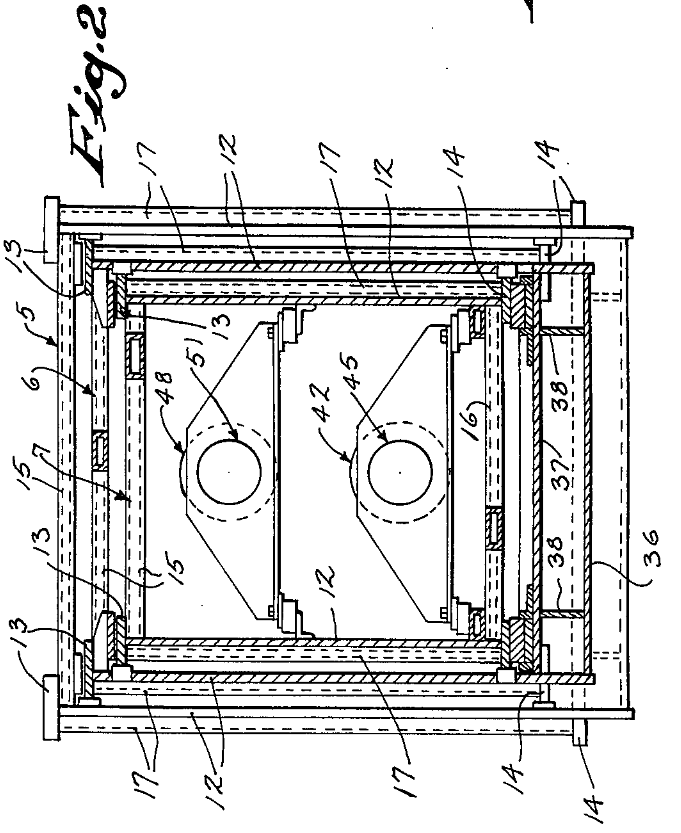
FIG. 2 is a view in cross section through the plane 2—2 shown in FIG. 1.
Figure 3:
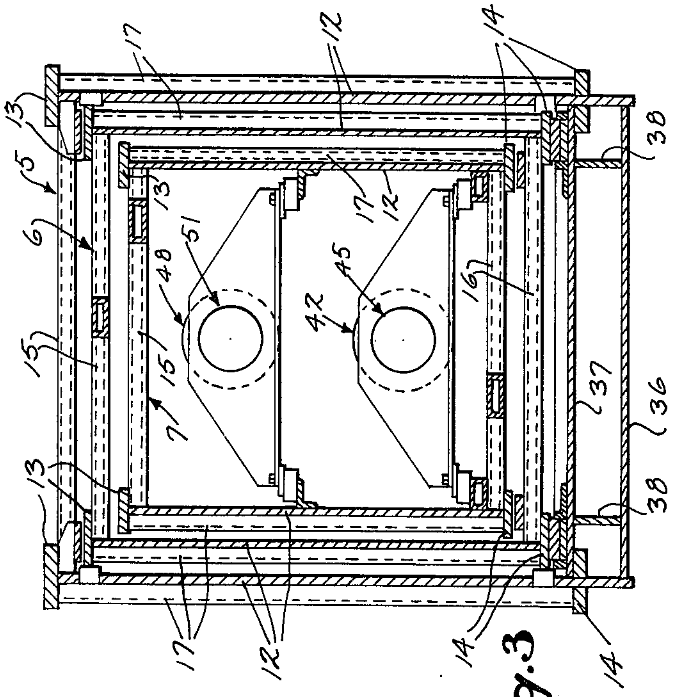
FIG. 3 is a view in cross section through the plane 3—3 shown in FIG. 1.

In FIG. 1, the reference numeral 1 designates generally a conventional truck crane with a wheeled carrier 2 and a revolving frame 3. While the invention is particularly satisfactory for such machines, however, it should be understood that it is applicable to any construction or excavating machine or other machine or equipment of any type where booms are provided. Referring to FIGS. 1–3, the truck crane 1 includes a three-section boom, indicated generally by the numeral 4, having a non-extensible base section 5, an extensible and retractable mid-section 6, and a second extensible and retractable tip section 7 carrying a suitable tip assembly 8 at its outer end. The rear or lower end of the base section 5 is pivotally mounted on the revolving frame 3 for pivotal motion in a vertical plane about a pivot axis 9. The boom 4 is raised and lowered by an elevation cylinder 10 connected to the revolving frame 3 and a bracket 11 welded to the base section 5. It should be obvious, however, that the boom need not be pivotal, may comprise more or less than three sections, and may otherwise vary from the preferred embodiment shown.

Figures 4, 5, 6, 7, 8:
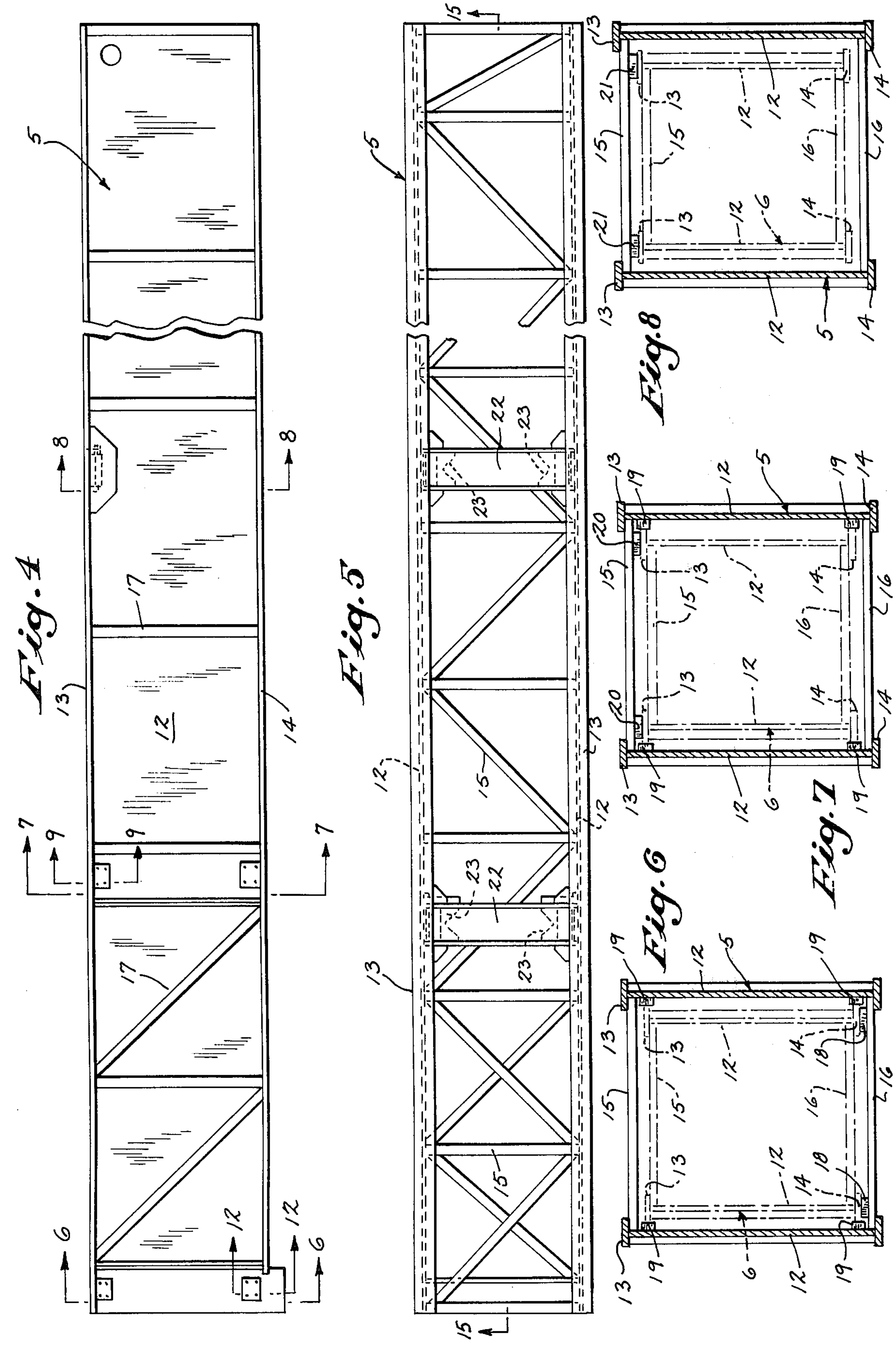
FIG. 4 is a side view, partially broken away, of the outermost section of the boom of FIG. 1.
FIG. 5 is a top view, partially broken away, of the boom section shown in FIG. 4.
FIG. 6 is a somewhat schematic view in cross section through the plane 6—6 shown in FIG. 4, but showing an inner section in broken lines.
FIG. 7 is a somewhat schematic view similar to FIG. 6, but taken through the plane 7—7 shown in FIG. 4.
FIG. 8 is a somewhat schematic view similar to FIG. 6, but taken through the plane 8—8 shown in FIG. 4.

Each section of the boom 4 includes a pair of side walls which are essentially reinforced I-beams and top and bottom walls of truss construction. The preferred embodiment utilizes boom sections having a rectangular or box-shaped configuration, and all three boom sections preferably have this beam-truss construction. Hence, for purposes of illustration, only one of the sections, base section 5, is shown in FIGS. 4 and 5, but it should be understood that the discussion of the general construction of the section walls is also applicable to mid-section 6 and section 7.

Each side wall is essentially an elongated I-beam which includes a vertical side web 12 between a top flange 13 and a bottom flange 14; and, the top and bottom walls are made of square, tubular truss members, numbered 15 and 16, respectively. The truss members 15 have ends which are welded or otherwise fixed to the underside of the top flanges 13 and to the interior surfaces of the side webs 12; and, the truss members 16 have ends which are welded or otherwise fixed to the upperside of the bottom flanges 14 and to the interior surfaces of the side webs 12; it is important to note that all the trusses 15 and 16 are disposed interiorly of the flanges 13 and 14, leaving the horizontal outer surfaces free for bearing purposes as will be described. The truss members 15 and 16 may be arranged along the boom 2 in any suitable arrangement; and the use and possible arrangements of the truss members for various applications will be readily understood and appreciated by those skilled in the art.

Figure 14:
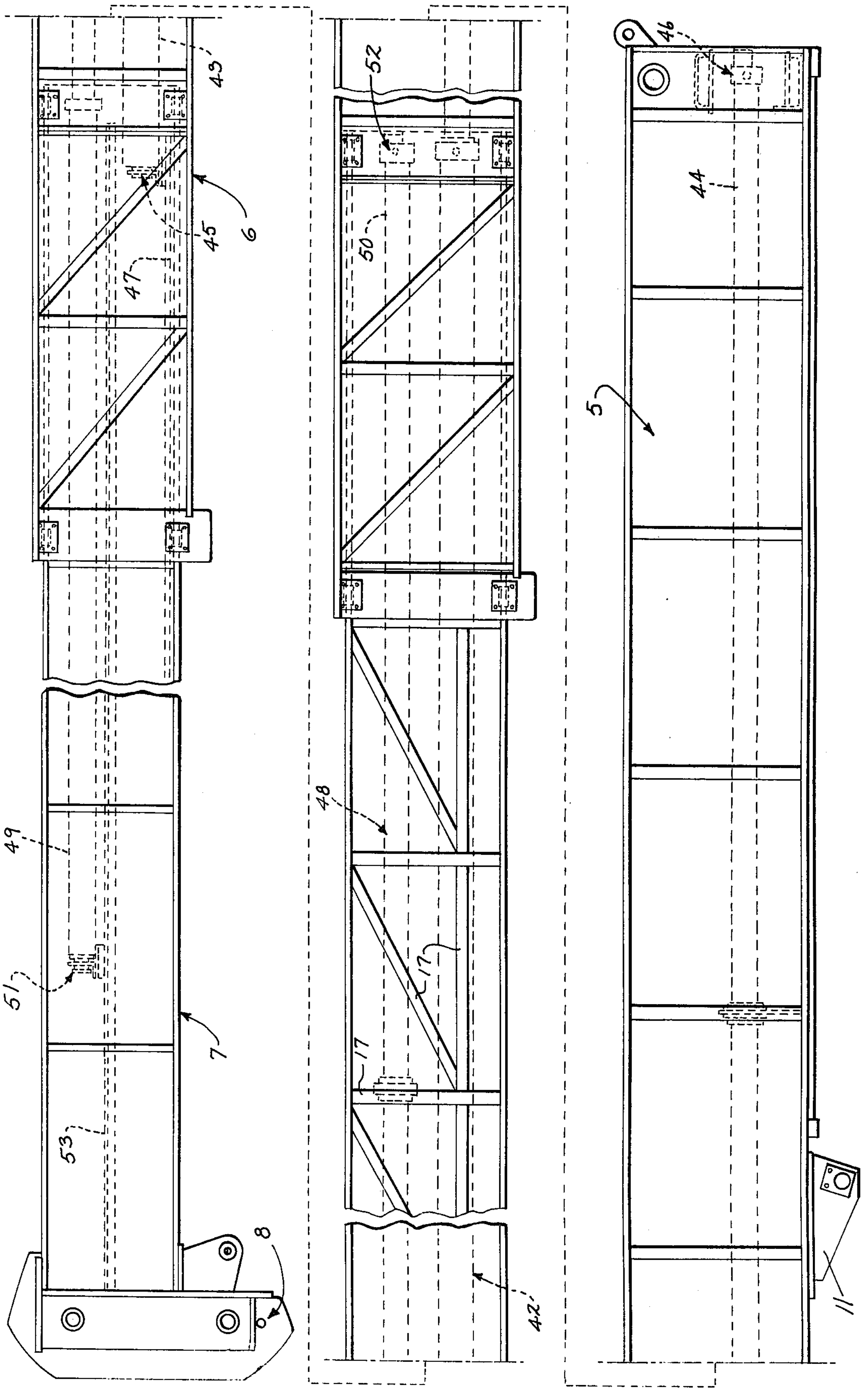
FIG. 14 is a side view in elevation, partially broken away, of the boom shown in FIG. 1, but showing the boom sections as they appear when fully extended.

The side webs 12 preferably have a thickness which is relatively small compared to the thickness of the flanges 13 and 14—this results in a significant reduction in weight and saving of material. These relatively thin side webs 12 can be reinforced where desired, however, and either vertical, diagonal or horizontal stiffeners 17, preferably of square tubular construction, or any combination of them, can be utilized for this purpose as shown in FIG. 14 where the boom 2 is shown fully extended. The stiffeners 17 are spaced along the boom section length, each vertical stiffener 17 being connected at one end to the top flange 13 and at its opposite end to the bottom flange 14. Each diagonal stiffener 17 is also connected at one end to the top flange 13 and at its opposite end to the bottom flange 14, while each horizontal stiffener 17 projects laterally between, and is joined at opposite ends to, a pair of vertical stiffeners 17. It should be noted that all of the stiffeners 17 are connected to the exterior surfaces of their associated side webs 12, but they are entirely within or interior of the side edges of the flanges 13 and 14. Thus, the stiffeners 17 do not interfere with the exterior flange edges that perform bearing functions to be described hereinafter. Again, the use and placement of the stiffeners for various applications will be readily understood by those skilled in the art.

There is a set of wear pad assemblies between the boom sections 5 and 6, and another set between sections 6 and 7; the wear pad assemblies serve in conventional fashion to provide support and bearing surfaces for extension and retraction, but their construction and arrangement are unique as will be described. The two sets of pad assemblies are identical, and so only the set associated with sections 5 and 6 will be described in detail, it being understood that the description also applies to the set associated with sections 6 and 7. Each set includes three groups of pad assemblies spaced along the boom length, and, as shown in FIGS. 6–8, all of the assemblies are fixed to the relatively larger or outer section 5. This arrangement of the pad elements is very important to the practice of the present invention, since it allows use of the beam-truss construction for the boom sections. In this connection, it has been conventional in the art to provide, for any two relatively telescoping boom sections, front wear pads secured to the forward end of the bottom wall of the relatively outer section, and rear wear pads affixed towards the rear end of the top wall of the relatively inner section, the latter riding on the top wall of the outer section as noted above. This arrangement would not, however, be feasible for the present invention since the trusses do not provide a continuous surface. By mounting all of the wear pad assemblies on the relatively larger section, the base section 5 in FIGS. 6–8, the flanges 13 and 14 of the relatively smaller section, mid-section 6, can be used to provide continuous bearing surfaces for any relatively telescoped position of the two sections.

Referring to FIGS. 4–8, the first group of wear pad assemblies is at the forward end of base section 5 and includes a pair of bottom wear pad assemblies 18 and four side wear pad assemblies 19. The next or second group is spaced rearwardly of the first mentioned group and includes a pair of top wear pad assemblies 20 and four side wear pad assemblies 19. Finally, the third group, which is spaced rearwardly of the second group, includes a pair of auxiliary top wear pad assemblies 21. Both of the assemblies 18 are mounted to the bottom wall of section 5 and each is positioned to engage the lower exterior surface of one of the bottom flanges 14. Similarly, both of the top assemblies 20 and both of the auxiliary top assemblies 21 are mounted to the top wall of section 5, and each is positioned to engage the upper exterior surface of one of the top flanges 13. All of the side assemblies 19 are mounted on the boom section side walls, each being situated to engage the exterior edge of an associated flange 13 or 14 and being disposed within the edges of the top and bottom flanges of the I-beam side wall to which it is connected. It should be noted that there are two groups of top assemblies 20 and 21 provided to accommodate various degrees of extension of mid-section 6.

It should be noted that all of the bottom assemblies 18, top assemblies 20 and auxiliary top assemblies 21 are substantially in vertical alignment with the side webs 12. This positional relationship diminishes transverse distortion of the boom sections.

Figure 9:
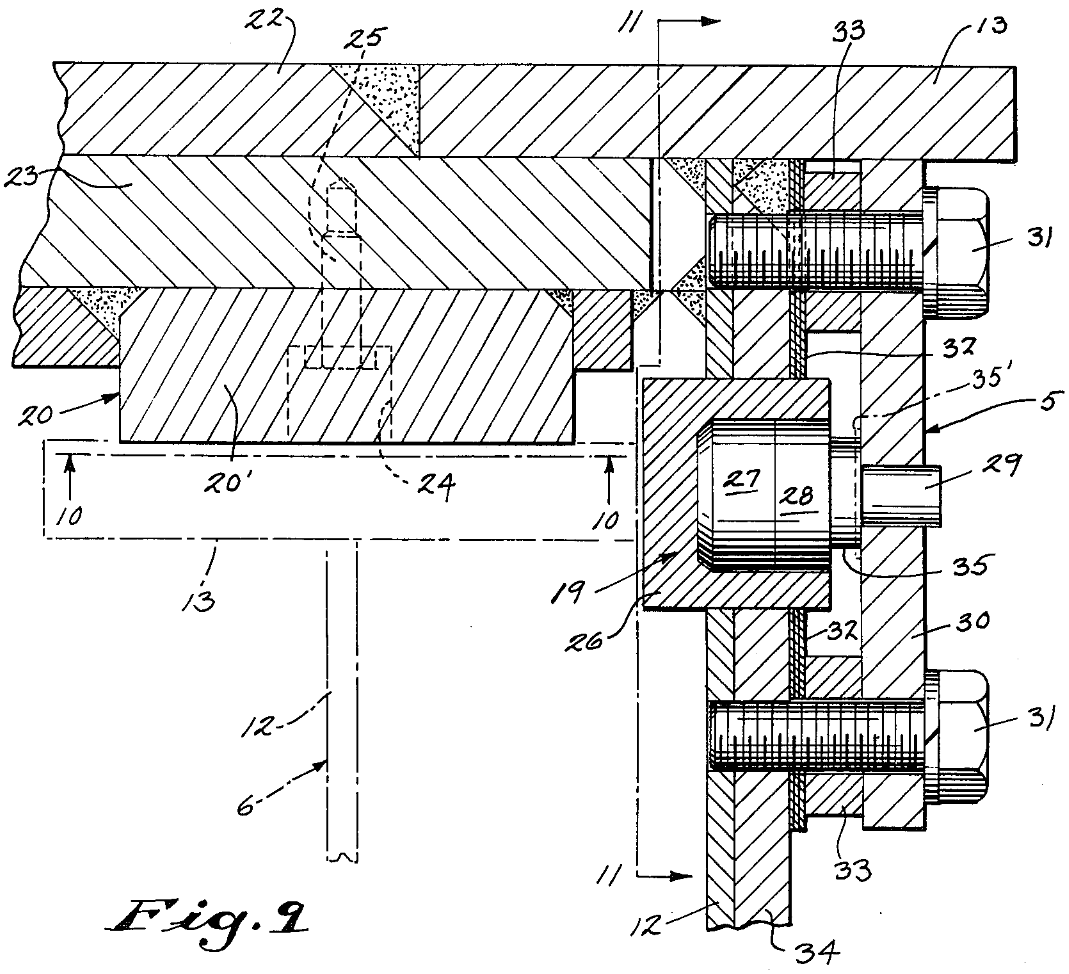
FIG. 9 is a fragmentary view in cross section through the plane 9—9 shown in FIG. 4.
Figure 10:
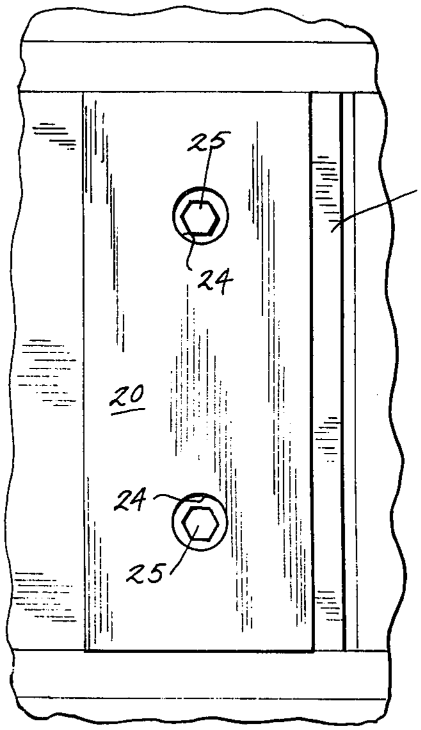
FIG. 10 is a fragmentary view in cross section through the plane 10—10 shown in FIG. 9.

The construction and mounting of one of the top assemblies 20—both assemblies 20 are identical—are shown in FIGS. 9 and 10. Both top assemblies 20 are secured to a support bar 22 which transversely extends across the width of the boom 4 with each of its ends being welded or otherwise fixed to one of the top flanges 13 of the boom section 5. Each top assembly 20 includes a pad 20' mounted within a retaining element 23, which is secured to the underside of the support bar 22, the interior underside of the top flange 13, and the interior surface of the side web 12. A pair of recessed openings 24 are formed in the pad 20', each opening 24 receiving a bolt 25 for attaching the pad 20' to the retaining element 23. In the preferred embodiment, the top pads 20' are rectangular in shape and composed of Grade CG or C graphite produced by Ryerson Plastics; however, other configurations and materials are utilizable. The structure and mounting arrangement of the auxiliary top assemblies 21 are identical to those described above for the top assemblies 20.

As previously noted, each of the side assemblies 19 is mounted on a boom section side wall in bearing engagement with an edge of one of the flanges 13 or 14 of the next inner or relatively smaller telescopic boom section. The structure of and mounting for the side assemblies 19 can be seen by reference to FIGS. 9, 11 and 12; the engagement between a side assembly member 19 mounted to base section 5 and a top flange 13 of mid-section 6 is shown in FIG. 9, and the engagement between another side assembly 19 mounted to base section 5 and a bottom flange 14 of mid-section 6 is shown in FIG. 12. All of the side assemblies 19 employed in the preferred embodiment are structurally identical, and are mounted similarly; thus, the detailed discussion of the side assemblies 19 shown in the noted views is exemplary of all of them.

Each side assembly 19 includes an outwardly opening cup-shaped bearing pad 26 which is slidably mounted within an opening in the side wall of the boom section. The bearing pad 26 encloses two spaced sets of bearing members, each including a cylindrically shaped elastomeric plug 27 inwardly adjacent a similarly shaped metal plug 28, the elastomeric plugs 27 being spaced from the interior surface of the pad 26 to allow for displacement. The closed end of the bearing pad 26 bears against the flange of the next inner section of the boom 4, while the surfaces of the metal plugs 28 form its opposite end.

Any desired force is applied to the metal plugs 28 to urge the bearing pad 26 tightly against the flange, the elastomeric plugs 27 imparting resiliency to the system. Such force is provided by a pair of headed backup buttons 29 that are loosely slidable in a cover plate 30 which is fastened to the side web 12 by four bolts 31, each passing through an enlarged opening in the cover plate 30 and in a shim 32. The shim 32 is U-shaped, and each of its legs is interposed between a nut 33 on the shaft of each bolt 31 and a frame member 34, which is intermediate the shim 32 and the side web 12. The frame member 34 has a central opening that slidably receives the bearing pad 26, and it restrains the bearing pad 26 from lateral movement and insures proper engagement between the bearing pad 26 and its associated flange. Each button 29 has a radially enlarged portion 35 which abuts one of the metal plugs 28 and applies the bearing force to the bearing pad 26, the force being dependent on the space between the cover plate 30 and the side web 12—this spacing is initially adjusted by selecting a shim 32 having an appropriate thickness.

The amount of force exerted by the bearing pad 26 against its associated flange will become reduced as the pad 26 becomes worn. Under such circumstances, the cover plate 30 may be unfastened from the side web 12 and removed to permit the placement of a washer 35' (shown in dotted lines) or other suitable structure on the shaft of each of the buttons 29. When the cover plate 30 is replaced in position, the washers 35' will be sandwiched between the enlarged portions 35 of the buttons 29 and the cover plate 30. The thickness of the washers 35' can be selected so that the buttons are positioned more tightly against the pad 26. The pad 26 provides a bearing and support surface along which the flange moves as the relatively inner section is extended and retracted.

Referring again to FIGS. 2 and 3, the bottom wear members 20 are mounted at the forward end of the bottom walls of base section 5 and mid-section 6; and, at this mounting position, the construction of sections 5 and 6 differs from that of section 7. Both sections 5 and 6 are provided with a box-like structure which has lower and upper bars 36 and 37, respectively, extending transversely between the side webs 12. At this location, the side webs 12 of both sections 5 and 6 depend beneath the lower flanges 14, and there are additional support bars 38 between the lower and upper bars 36 and 37. This structure adds additional bracing which is needed to resist large downward stresses concentrated at the forward end of the boom 4 when either or both mid-section 6 and section 7 are extended and a load is suspended from the tip.

In FIGS. 11 and 12, one of the bottom assemblies 18—both are identical—mounted on the base section 5 is shown in bearing engagement with a lower flange 14 of mid-section 6. Each bottom assembly 18 is composed essentially of an upper bearing pad 39 and a subjacent lower backup member 40. The members 39 and 40 are each held in place on one side by a bracket 41 fastened to the upper bar 37 by a bolt 42, and on its other side by an upright lug 43 welded to the upper bar 37. It should be noted that the backup member 40 is preferably an elastomeric material which provides the bottom wear member 18 with a certain degree of resiliency, and is spaced from the lower bar 37 to allow for displacement.

Figure 15:
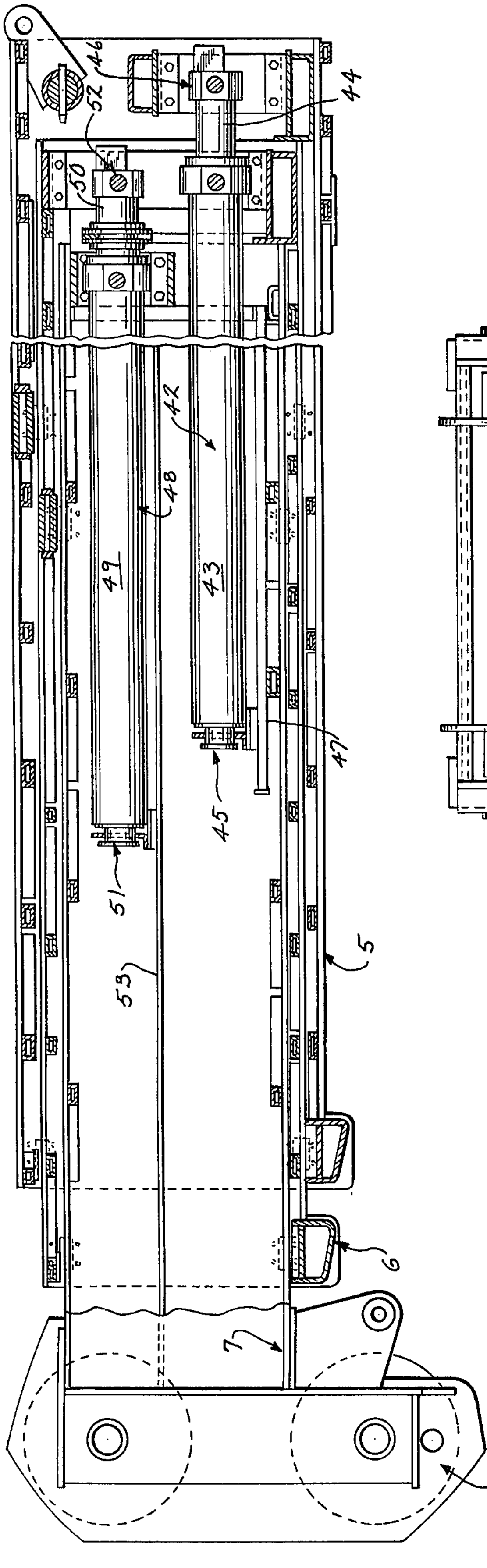
FIG. 15 is a view, partially broken away, in cross section through the plane 15—15 shown in FIG. 5.
Figure 16:
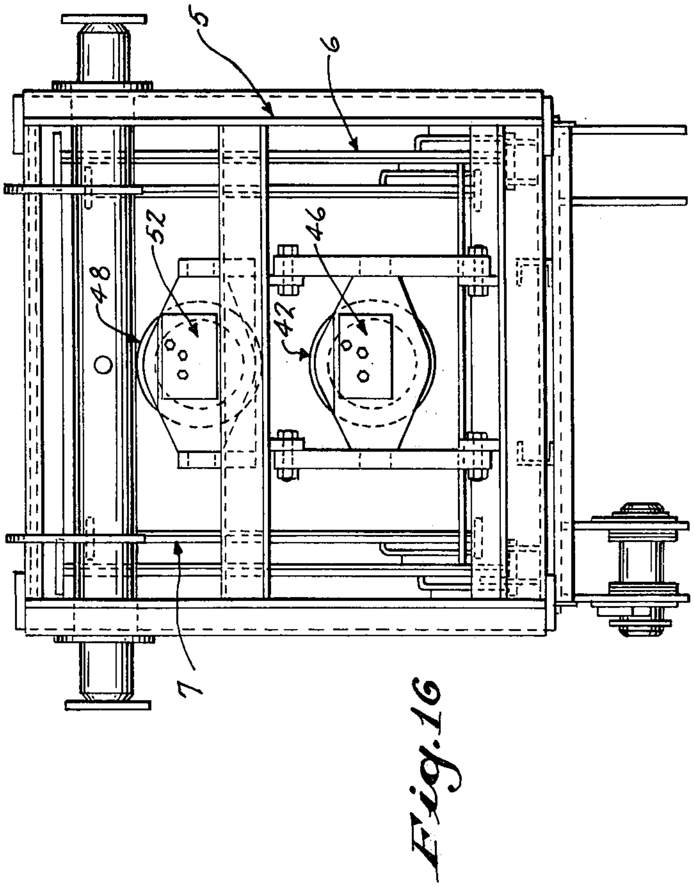
FIG. 16 is an inner end view of the boom shown in FIG. 1.

The extensible and retractable sections of the boom 4, mid-section 6 and section 7 in the preferred embodiment, are hydraulically operated. The boom 4 is shown fully extended in FIG. 14 and fully retracted in FIG. 15, and, in FIGS. 14–16 the preferred operating arrangement is illustrated. A hydraulic actuating cylinder 42 is provided for extending and retracting the mid-section 6; and has its cylinder end 43 pinned near the forward end of mid-section 6 and its rod end 44 pinned at the rear end of base section 5. The cylinder end 43 is pinned to a forward mounting assembly 45 and the rod end 44 is pinned to a rear mounting assembly 46; the forward mounting assembly 45 is connected to a transverse support plate 47 in section 7 which is spaced above the bottom wall of section 7 so as not to interfere with the movement of it. A hydraulic actuating cylinder 48 is used for extending and retracting the section 7; and has its cylinder end 49 pinned near the forward end of section 7 and its rod end 50 pinned at the rear end of mid-section 6. The cylinder end 49 is pinned to a forward mounting assembly 51 and the rod end 50 is pinned to a rear mounting assembly 52; the forward mounting assembly 51 is connected to a transverse support plate 53 running through section 7 midway between its top and bottom walls and which serves to add rigidity to section 7. Each of the cylinders 42 and 43 is a double acting hydraulic cylinder which is operable only to extend and retract its associated section. However, other arrangements can be used; for example, signal acting cylinders can be used to extend the sections, and retraction of the sections can be accomplished by cables.

The preferred embodiment shown and described provides a construction for the sections of a telescopic boom substantially increasing the boom capacity for a given weight. As indicated above, however, various changes might be made in the preferred embodiment without departure from the spirit of the invention. The boom may be used in various environments, may include more or fewer sections, and may utilize various mechanisms for extension and retraction of the movable sections. Although the construction of the pad assemblies shown is preferred, other arrangements might be used. In view of the many possible modifications, the invention is not intended to be limited by the showing or description herein, or in any other manner, except as may specifically be required.

I claim:

1. In a telescopic boom having inner and outer boom sections, wherein the inner boom section is extensible and retractable within the outer boom section, the improvement wherein each section has: I-beam side walls having top and bottom flanges; and truss top and bottom walls, the truss members of both said top and bottom walls for each section extending laterally between said side walls and being connected thereto interiorly of the flanges, the truss members being further connected to the interior surfaces of the flanges; and wherein the outer boom section has: a pair of bottom wear assemblies, each including a bottom wear pad in bearing engagement with one of the bottom flanges of the inner boom section; a pair of top wear assemblies, each including a top wear pad in bearing engagement with one of the top flanges of the inner boom section; and a set of side wear assemblies connected to said I-beam side walls, each including a side wear pad in bearing engagement with the exterior edge of one of the flanges of the inner boom section.

2. A boom according to claim 1, wherein in each section there is a plurality of stiffeners spaced along the length of each I-beam side wall between, and interiorly of the edges of, its associated top and bottom flanges.

3. A boom according to claim 1, wherein:

said bottom wear assemblies are connected to the outer boom section near the forward end thereof;

said top wear assemblies are connected to the outer boom section rearwardly of said bottom wear assemblies; and a second pair of top wear assemblies is connected to the outer boom section and spaced rearwardly of said first mentioned pair of top wear assemblies, each of the top wear assemblies of the second pair including a top wear pad in bearing engagement with one of the top flanges of the inner boom section.

4. A boom according to claim 3, wherein:

said side wear assemblies are connected to the outer boom section near the forward end thereof;

a second set of side wear assemblies is connected to said I-beam side walls of the outer boom section and spaced rearwardly of said first mentioned set of side wear assemblies substantially within the same plane as said top wear assemblies, each of the side wear assemblies of the second set including a side wear pad in bearing engagement with the exterior edge of one of the flanges of the inner boom section.

5. In a telescopic boom having inner and outer boom sections, wherein the inner boom section is extensible and retractable within the outer boom section, the improvement wherein:

each section has: I-beam side walls having top and bottom flanges; and truss top and bottom walls, the truss members of both said top and bottom walls for each section extending laterally between said side walls and being connected thereto interiorly of the flanges;

there is a set of side wear assemblies connected to said I-beam side walls of the outer section, each side wear assembly having a side wear pad which bears against one of the flanges of the inner section and being disposed within the edges of the top and bottom flanges of the I-beam side wall to which it is connected;

each of the I-beam side walls of the outer section has a pair of openings, each of which has one of said side wear assemblies disposed therein, and wherein each of said side wear assemblies comprises:

a bearing pad; and a pair of bearing members within said bearing pad in contact with one another, one of said bearing members being formed of an elastomeric material;

there is a cover plate connected to the exterior side of each I-beam side wall near each side wear assembly;

there is a pin having a headed end in contact with one of said bearing members and an opposite end passing through said cover plate, said pin applying a bearing force to said bearing pad; and there is a shim interposed between said cover plate and said I-beam side wall to adjust the space therebetween and the force which is applied to said bearing pad.

6. In a telescopic boom having inner and outer boom sections, wherein the inner boom section is extensible and retractable within the outer boom section, the improvement wherein:

the outer boom section has a wall having an opening in which a wear assembly is slidably mounted, said wear assembly including:

a bearing pad; and a pair of bearing members within said bearing pad in contact with one another, one of said bearing members being formed of an elastomeric material;

a cover plate is connected to the exterior side of the wall near said wear assembly;

a pin having a headed end in contact with one of said bearing members and an opposite end passing through said cover plate applies a bearing force to said bearing pad for bearing engagement with the inner boom section; and a shim is interposed between the wall and said cover plate to adjust the force applied to said bearing pad.

7. A boom according to claim 6, wherein a washer is disposed on said pin between the headed end of said pin and said cover plate to position the headed end closer to said bearing pad.

* * * * *